June 1, 1954 G. A. OLOFSSON ET AL 2,679,999
AUTOMATIC WEIGHING MACHINE
Filed Feb. 27, 1950 5 Sheets-Sheet 1
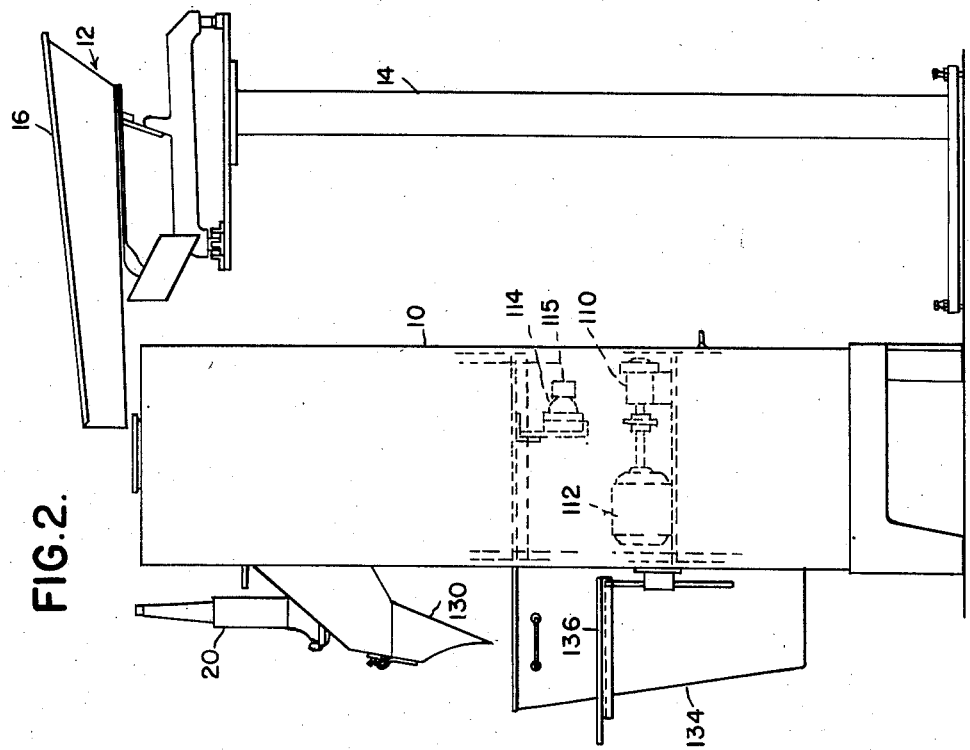
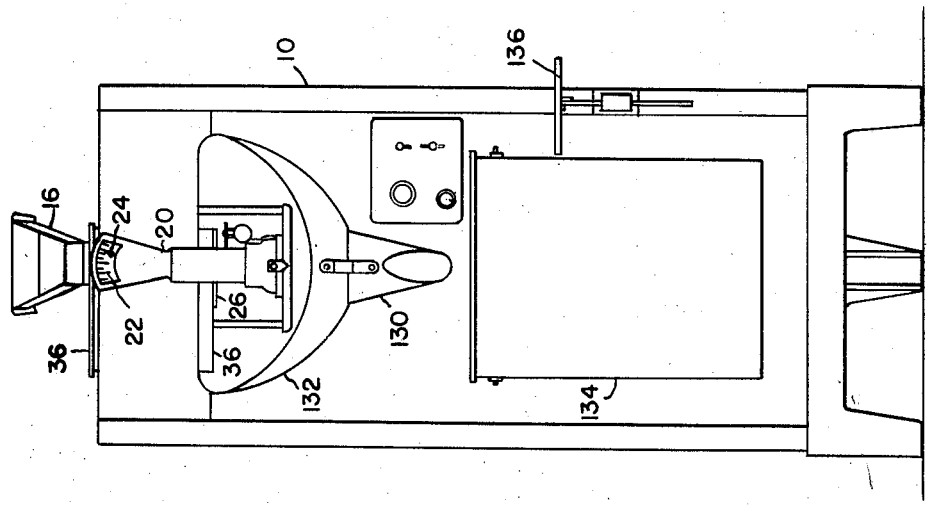
*INVENTORS*
GUSTAV A. OLOFSSON
LOYDE N. CHUBB
BY Whittemore, Hulbert
& Belknap
ATTORNEYS

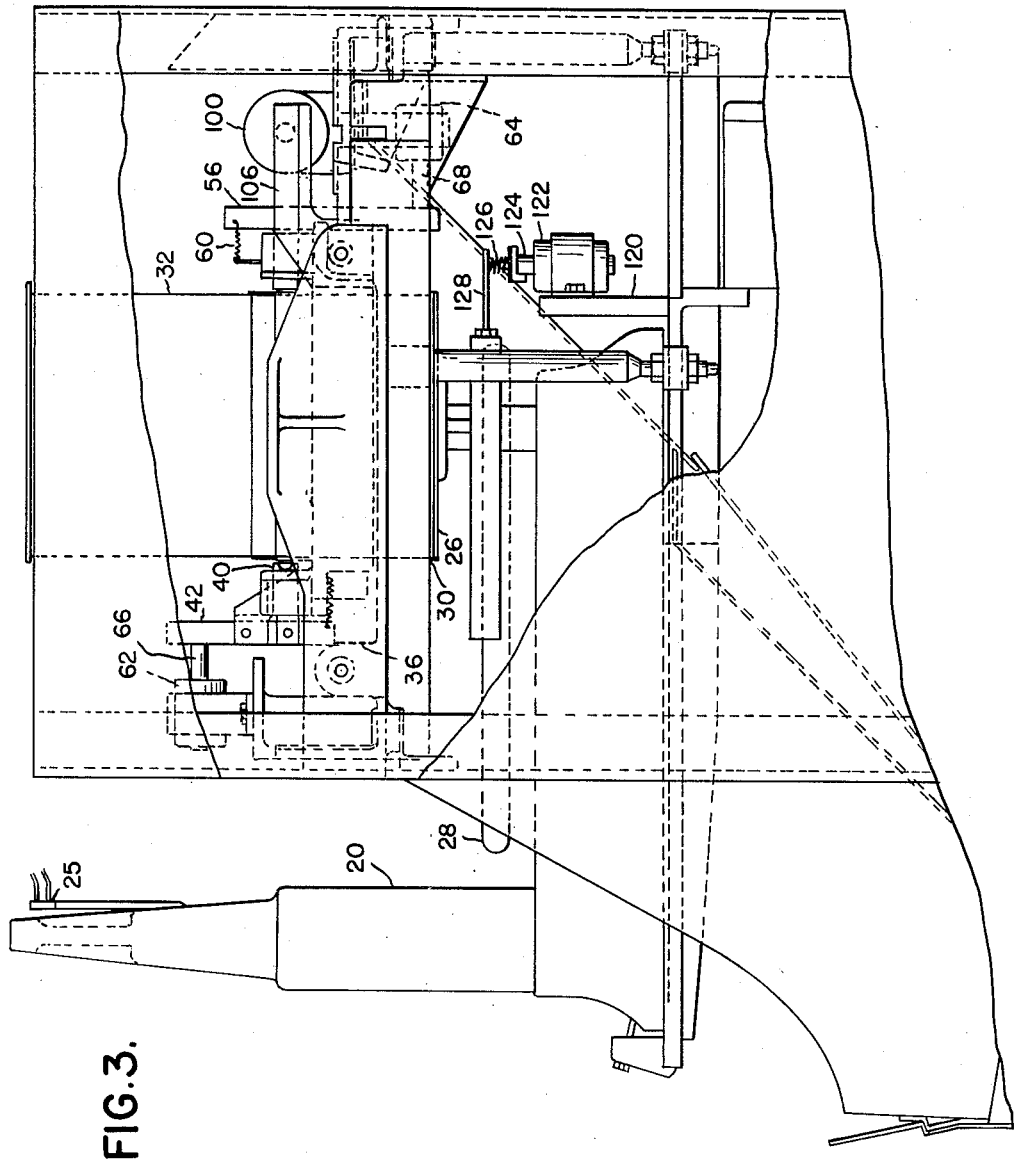

June 1, 1954  G. A. OLOFSSON ET AL  2,679,999
AUTOMATIC WEIGHING MACHINE
Filed Feb. 27, 1950  5 Sheets-Sheet 3

INVENTORS
GUSTAV A. OLOFSSON
BY LOYDE N. CHUBB
Whittemore, Hulbert
& Belknap
ATTORNEYS June 1, 1954     G. A. OLOFSSON ET AL     2,679,999
AUTOMATIC WEIGHING MACHINE
Filed Feb. 27, 1950     5 Sheets-Sheet 4
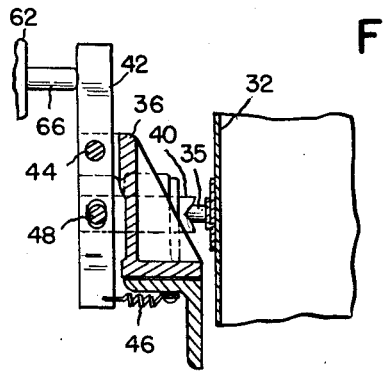
FIG.5.
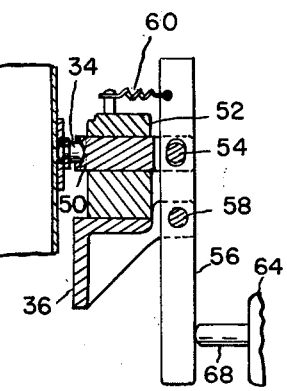
FIG.6.     FIG.7.
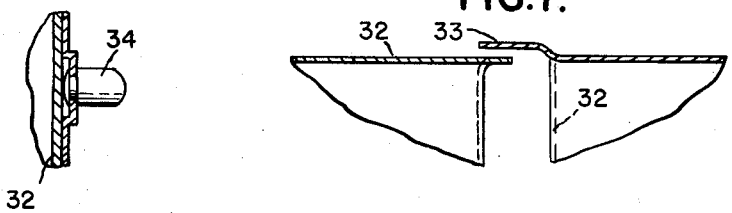
FIG.8.
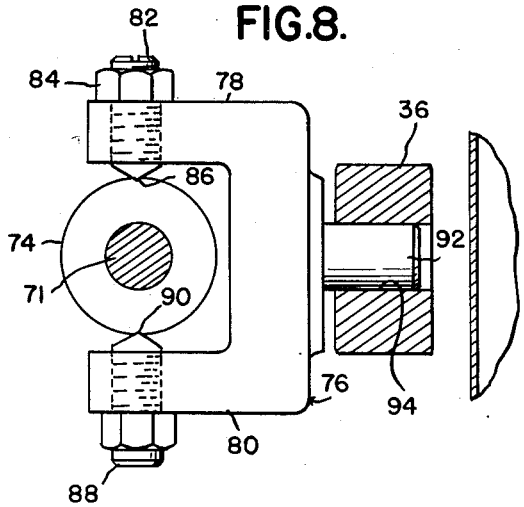
INVENTORS
GUSTAV A. OLOFSSON
LOYDE N. CHUBB
BY
Whittemore, Hulbert
& Belknap
ATTORNEYS

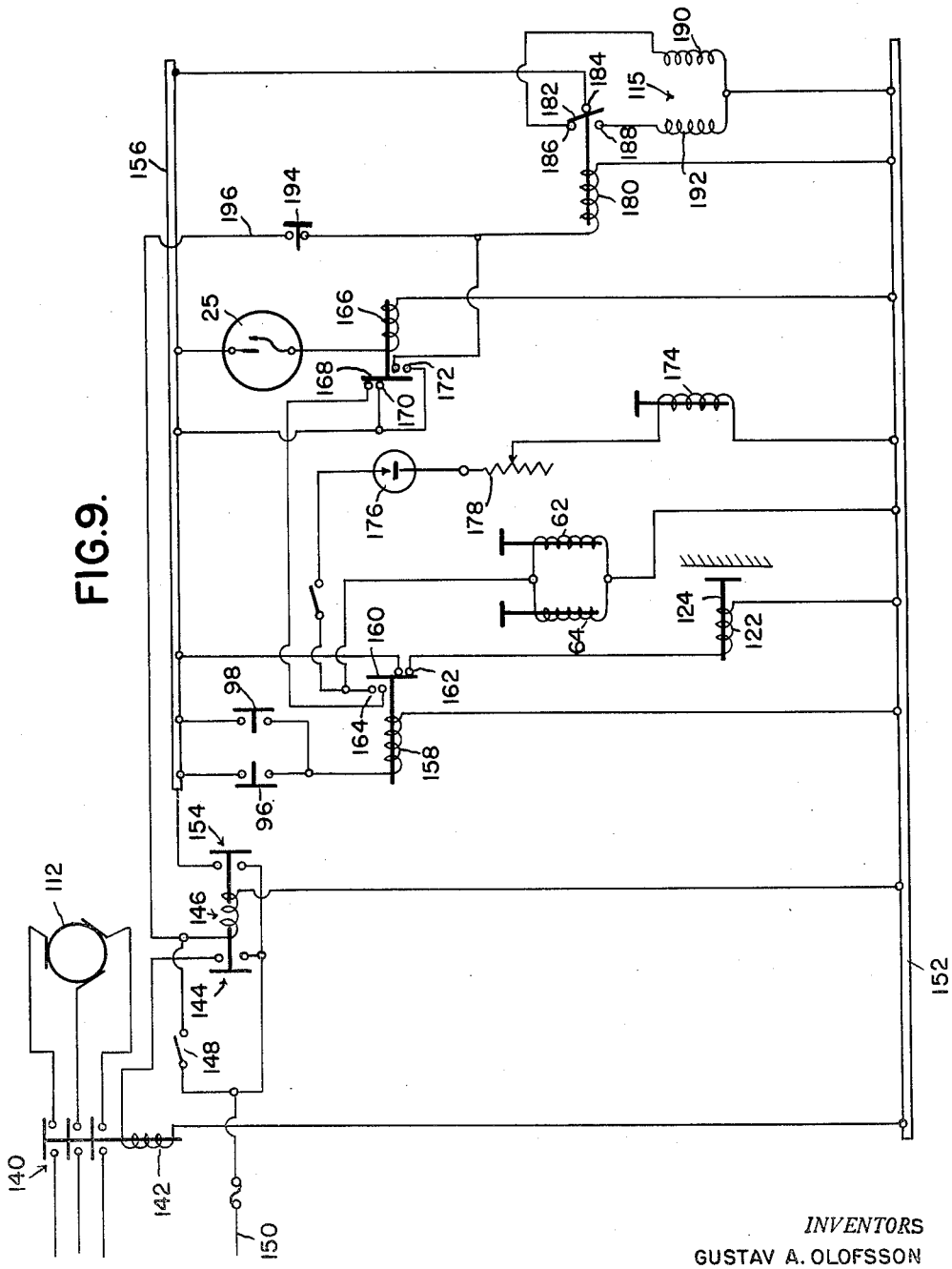

Patented June 1, 1954

2,679,999

UNITED STATES PATENT OFFICE 2,679,999

AUTOMATIC WEIGHING MACHINE

Gustav A. Olofsson and Loyde N. Chubb, Lansing, Mich., assignors to Olofsson Tool & Die Company, Lansing, Mich., a corporation of Michigan Application February 27, 1950, Serial No. 146,559

17 Claims. (Cl. 249—23)

The present invention relates to an automatic weighing machine, and more particularly to an automatic weighing machine adapted to weigh measured quantities of bulk material and to discharge weighed quantities of such material for packaging.

It is an object of the present invention to provide a weighing machine characterized by the extreme accuracy with which predetermined quantities of bulk material can be weighed, the rapidity with which successive quantities of such material can be weighed, and the efficiency of the complete operation.

More specifically, it is an object of the present invention to provide a weighing machine including a weighing platform in combination with a pair of open-bottom buckets movable transversely across the platform so that one or the other of the buckets registers therewith, means for releasing the bucket overlying the platform so that the bucket rests upon the platform during the weighing operation, and means for raising the bucket from the platform upon completion of a weighing operation.

It is a further object of the present invention to provide in apparatus of the type described in the preceding paragraph, resilient means effective to bias the weighing platform upwardly and control means therefor effective to initiate the upward biasing effect of said biasing means upon completion of a weighing operation.

It is a feature of the present invention to provide novel guide means for a carriage mounted on a pair of spaced guide rails.

It is a further feature of the present invention to provide bucket lifting and supporting means comprising elements movable toward and away from the bucket at opposite sides thereof, said elements and bucket having cooperating camming recesses and fingers.

Other objects and features of the invention will become apparent as the description proceeds, especially when considered in conjunction with the accompanying drawings, wherein:

Figure 1 is a front elevation of the complete machine.

Figure 2 is a side elevation of the machine shown in Figure 1.

Figure 3 is an enlarged side elevation of the upper portion of the weighing machine with parts broken away.

Figure 5 is a section on the line 5—5, Figure 4.

Figure 6 is an enlarged transverse section through one of the supporting fingers on a bucket.

Figure 7 is a fragmentary section on the line 7—7, Figure 4.

Figure 8 is an enlarged fragmentary section on the line 8—8, Figure 4.

Figure 9 is a wiring diagram illustrating the control mechanism for the weighing machine.

Figure 4:
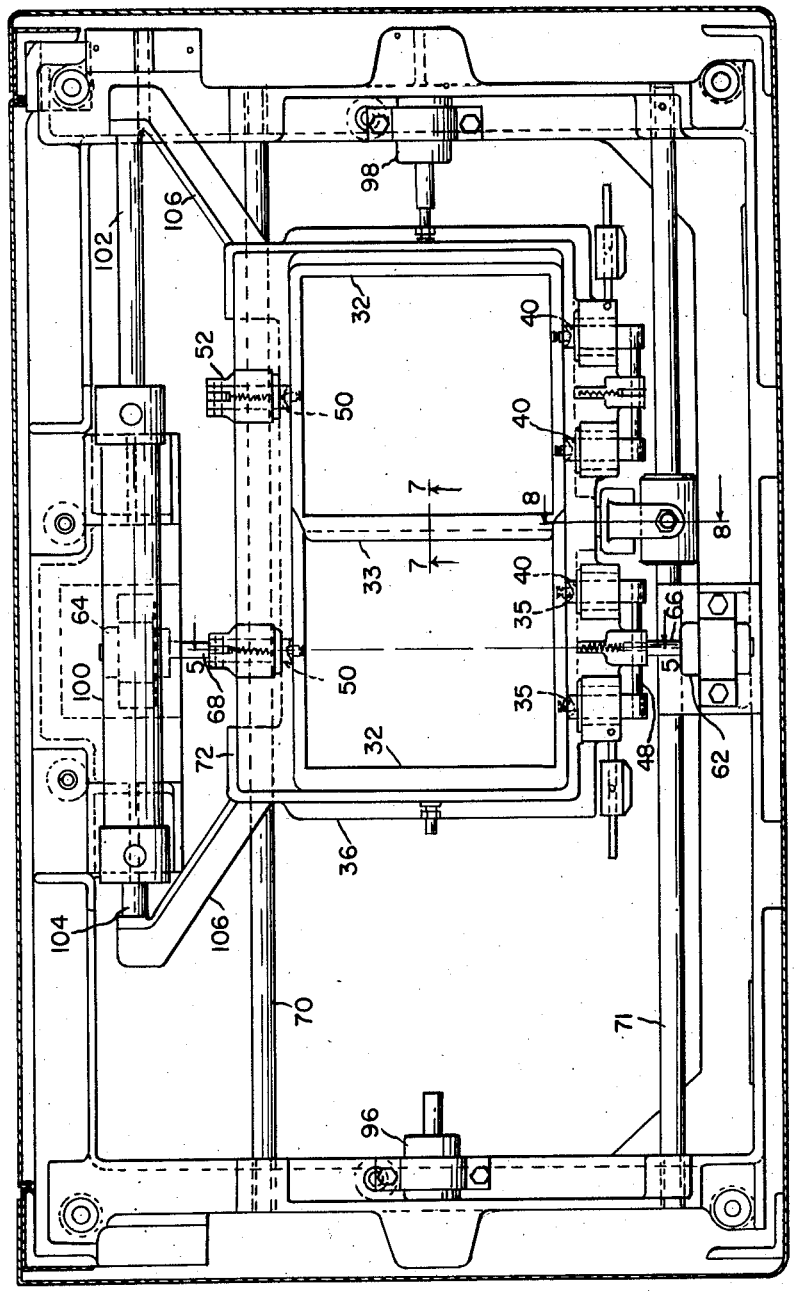
Figure 4 is a plan view of the machine.

Referring now to the drawings, the weighing apparatus comprises essentially a weighing and discharge machine 10 having associated therewith a material feeding device 12 mounted on a pedestal 14. The feeding device is of the type subjected to differential vibration to cause bulk material to advance along the floor of a tray 16 at a predetermined rate.

The weighing machine 10 includes a weighing scale 20 having a graduated dial 22 thereon, an indicating finger 24, a weighing platform 26, and a balance arm 28. A control switch 25 is provided on the weighing mechanism which is adapted to be closed when a predetermined weight is registered by the weighing scale. The control switch 25 may be of any suitable type such for example as a mercury switch adapted to be actuated by a magnet when the indicating pointer or finger 24 reaches a predetermined point on the indicator dial 22.

The weighing platform 26, as best seen in Figure 3, is provided at its front and rear with upwardly extending flanges 30, and is adapted to receive one or the other of a pair of open-bottom buckets 32. In order to prevent accumulation of bulk material being weighed intermediate the buckets 32, one of the buckets, as best illustrated in Figure 7, has a flange 33 which extends over the adjacent edge of the adjacent bucket.

A carriage 36 is provided in which the buckets 32 are located and releasable bucket lifting and supporting means are provided on the carriage for engaging cooperating members on both of the buckets. This means is best illustrated in Figure 5 in which one of the buckets 32 is shown as provided at one side with a laterally projecting finger 34, and at the other side with a pair of identical but laterally spaced projecting fingers 35. The side of the frame corresponding to the location of the fingers 35 is provided with a pair of pins 40 mounted for longitudinal movement toward and away from the bucket 32. An actuating lever 42 is pivoted as indicated at 44 and is connected to the carriage 36 by a tension spring 46 biasing the lever 42 in a counterclockwise direction as seen in Figure 5. Interconnecting the lever 42 and each of the pair of pins 40 is a rod 48 (Figure 4) so that upon rocking movement of the lever 42 both of the pins 40 are advanced or retracted in unison. The pins 40 at their inner ends are provided with transversely extending V-slots as best seen in Figure 5, which are adapted to receive the ends of the fingers 35.

At the opposite side of the carriage 36 there is provided a pin 50 guided for longitudinal sliding movement in a guide block 52. Connected to the pin 50 by a pivot indicated at 54, is a lever 56 which is mounted for rocking movement about a pivot indicated at 58. A tension spring 60 interconnects the upper end of the lever 56 to the block 52 and biases the lever for counterclockwise rocking movement as seen in Figure 5. The inner end of the pin 50 is provided with a conical recess for the reception of the rounded end of the finger 34.

When the pins 40 and 50 are moved inwardly the pin 50 as a result of the conical recess in its end, locates the finger 34 with exactness. The pins 40 however, being provided with transversely extending V-slots, merely pick up and engage the rounded ends of the fingers 35 so that in effect the bucket 32 floats in a three-point support provided by its fingers 34 and 35. Travel of the scale platform in weighing is limited so that pins 40 and 50 remain in operative relationship with respect to fingers 34 and 35.

As best seen in Figure 4, the weighing machine includes a pair of solenoids 62 and 64 having plungers 66 and 68 respectively. It will be appreciated that the carriage 36 includes sets of pins 40 and 50 for each of the buckets 32. When the carriage 36 is in one or the other of its two limiting positions, so that one or the other of the two buckets 32 is directly over the weighing platform 26 of the scale, the levers 42 and 56 are respectively positioned opposite the plungers 66 and 68 of the solenoids. The tension springs 46 and 60 bias their respective levers in a direction to cause the pins 50 and 40 respectively to engage the fingers 34 and 35 of the buckets. When the solenoids are energized the levers 42 and 56 are rocked against the action of the tension springs in a direction to retract the pins 40 and 50 and thus to release the appropriate bucket 32 for downward movement against the platform 26.

Means are provided for guiding the carriage 36 in its traverse strokes between limiting positions and this means comprises guide rails 70 and 71 which may if desired be in the form of round bars. The carriage 36 is provided with suitable guide bushings 72 which pass over the guide rail 70. Special means are provided for supporting the opposite side of the carriage from the guide rail 71 and this mechanism is best illustrated in Figure 4 taken in conjunction with Figure 8. Mounted on the rail 71 is a cylindrical slide or block 74. A yoke 76 having an upper arm 78 and a lower arm 80 is provided. Extending through the upper arm is a pointed screw 82 having a lock nut 84 thereon, the screw being pointed as indicated at 86, and the point of the screw being seated in a correspondingly shaped conical recess provided at the top of the block 74. The lower arm 80 is provided with a similar screw 88 having a pointed end 90 also seated in a correspondingly shaped conical recess located at the underside of the block 74. The yoke 76 is provided with a laterally extending cylindrical arm 92 which extends toward the carriage 36 and is received within a correspondingly shaped cylindrical socket 94. This arrangement permits free movement of the carriage 36 even though the guide rails 70 and 71 may be misaligned or warped or otherwise out of true. The yoke 76 is movable as a unit axially of its cylindrical arm 92. It may also rotate about the axis of its cylindrical arm 92. Moreover, the yoke 76 is permitted relative angular movement about the axis established by the line passing through the points 86 and 90.

Suitable means are provided for controlling back and forth traverse of the carriage 36 and this means includes a pair of limit switches 96 and 98 whose specific operation will subsequently be described.

Means are provided for effecting power movement of the carriage 36 from one limiting position to the other and this means is herein illustrated as comprising a hydraulic cylinder 100 having a piston therein connected to piston rods 102 and 104 extending from opposite ends thereof. The carriage 36 is provided with traverse arms 106 having flat surfaces engageable by the flat ends of the piston rods 102 and 104. This arrangement permits some relative transverse movement between the piston rods 102 and 104 and the traverse arms 106 of the carriage so that if misalignment exists between the cylinder and the path of movement of the carriage 36, free traverse of the carriage is still obtainable.

The hydraulic cylinder 100 is connected by suitable means (not shown) to a pump 110 located in the machine 10 and connected for drive by an electric motor 112. A conventional four-way reversing valve is indicated at 114 which includes a ratchet relay control solenoid 115 which when actuated results in reversal of the direction of flow of hydraulic fluid to and from the hydraulic cylinder 100.

As best seen in Figure 3, a bracket 120 carries an electric solenoid 122 having a plunger 124 at the upper end thereof which is mounted on a compression spring 126. The weighing scale 20 includes a pivot arm 128 which is herein illustrated as connected to the balance arm 26 which overlies the compression spring 126. When the solenoid 122 is energized the armature or plunger 124 is moved upwardly and the compression spring 126 engages the underside of the arm 128. This has the effect of biasing the mechanism of the weighing scale 20 so as to cause upward movement of the platform 26.

The machine 10 is provided with a forwardly extending discharge nozzle 130 which extends to either side of the platform 26 of the weighing scale. The arrangement is such that when a predetermined quantity of bulk material has been weighed within one of the buckets 32, the carriage 36 is traversed laterally, thus scraping the weighed material off the weighing platform whence it falls downwardly into the upwardly enlarged portion 132 of the discharge outlet 130. It will be appreciated that weighed quantities of material are thus discharged first from one side and then the other of the weighing platform, but in either case the material is discharged through the outlet or nozzle 130.

Preferably, a receptacle 134 is attached to the front of the machine 10 and is adapted to catch bulk material which may not otherwise be caught by the operator. Also preferably, a removable table 136 is provided for the convenience of the operator.

In operation the operator stands at the front of the machine and holds a paper bag or other receptacle under the nozzle 130. As each quantity of bulk material is weighed and discharged it is caught in the receptacle which is then closed and disposed of.

Control means for rendering operation of the machine fully automatic is provided. The pump motor 112 is connected to a conventional three phase system through a starting switch 140 which is controlled by starting relay 142 in series with a switch 144 controlled by a relay 146. Manual switch 148 when closed connects a 110-volt line 150 through the windings of the relay 146 to the return 110-volt bus 152, thus closing the switch 144 and energizes the relay 142 of the motor starting switch 140. At the same time energization of relay 146 results in closure of switch 154 which in turn energizes the main control bus 156.

The limit switches 96 and 98 are connected in parallel to the bus 156 and control a circuit to a relay 158. The relay 158 controls the position of a contact 160 which in turn closes the pairs of contacts 162 or 164, contacts 162 being normally closed and contacts 164 being closed when relay 158 is energized. It will be observed that when either of the limit switches 96 or 98 is closed, contact 160 is in position to complete a circuit between the contacts 164.

Contacts 162 are in a circuit extending from the bus 156 to the solenoid 122 which controls the position of the plunger 124 which carries resilient platform biasing spring 126, and it will be observed that this circuit is directly between the bus bars 152 and 156 and is controlled solely by the relay 158. A third relay 166 is provided which is in series with the scale switch 25 and includes a movable contact 168 adapted to close a pair of contacts 170 or 172, contacts 170 being normally closed and contacts 172 being closed when the relay 166 is energized. Contacts 170 complete a circuit from the bus bar 156 to the contacts 164 and thence to the solenoids 62 and 64 which are in parallel, and to a solenoid 174 which controls the vibrating mechanism associated with the feeding device 12. A suitable rectifier as indicated at 176 and a control rheostat 178 are provided in the circuit for effecting vibration of the material feeding mechanism. The normally open contacts 172, which are closed by the contact 168 when the relay 166 is energized, supplies current to a ratchet relay 180 which controls the position of the contact 182. The contact 182 is adapted to connect a contact 184 with either of the contacts 186 or 188, depending upon its position. The ratchet relay 180 is of a standard type and upon each energization thereof it effects movement of the contact 182 from one to the other of its two positions. The contact 182 establishes a circuit which supplies current to one or the other of the two windings 190 or 192 of the solenoid 115, thus reversing the four-way valve 114.

The ratchet relay 180 is provided with a manual control including manual switch 194 provided in a line 196 which connects the relay 180 to the input line 150 through the manual switch 148.

With the foregoing description of the circuit, the operation of the mechanism is believed apparent but for completeness it will be described.

With the parts in the position illustrated in Figure 9 the carriage 36 must be assumed in an intermediate position since both of the limit switches 96 and 98 are illustrated as open. At this time a circuit is completed through contacts 160 and 162 to the solenoid 122 and accordingly, the plunger 124 of the platform biasing spring 126 is urged upwardly and thus the platform of the scale is resiliently retained in upward position against the lower edge of one of the buckets 32. As a result a controlled scraping action is effected by the lower edge of the filled bucket. However, in the event that material becomes wedged under the edge of the bucket and between the bucket and the platform, the platform of the scale can move downwardly against the biasing force of the spring 126, so that no injury to the delicate mechanism can result.

Upon completion of traverse of the carriage 36 one or the other of the two limit switches 96 or 98 will be closed. Upon closure of either of these switches a circuit will be established through the relay 158 which will immediately close the contacts 164, thus establishing a circuit through the contacts 170 and the contacts 164 to the vibrating solenoid 174 of the feed mechanism and to the solenoids 62 and 64 of the bucket release mechanism. The effect of energizing the winding of the solenoid 174 is to immediately start feeding bulk material into the bucket which has just been positioned over the platform of the scale. The effect of energizing the solenoids 62 and 64 is to retract the pins 40 and 50 respectively and to release the bucket which has just been positioned over the platform, for downward movement with the platform during the weighing operation. Simultaneously with the closure of the contact 164, the contact bar 160 is separated from the contacts 162, thus de-energizing the solenoid 122, thereby moving the biasing spring 126 downwardly to permit downward movement of the scale platform in the usual manner.

Material continues to discharge into the bucket 32 which overlies the scale platform 26 until a predetermined weight is indicated by the dial. It may be mentioned at this time that the present mechanism provides for weighing the bucket together with its contents and this has been found to contribute materially to the accuracy of results obtained. In many cases and dependent in part upon the character of the material being weighed, the bulk material tended to adhere to the inner walls of the bucket or to form a cone therein so that a true indication of the weight of the material located within the confines of the bucket was not obtained. By the present mechanism the buckets, which may be of relatively light weight and which are selected so as to be of identical weight, are weighed each time a quantity of bulk material is weighed.

When the predetermined weight which represents the combined weight of a bucket and the bulk material therein is indicated by the weighing scale, the switch 25 closes and a circuit is completed through the relay 166. This has the immediate effect of opening contacts 170 and thereby breaking the circuit to the feed mechanism and to the solenoids 62 and 64 which actuate the bucket supporting pins 40 and 50. Pins 40 and 50 move inwardly and raise the adjacent bucket from the scale. At the same time the contact bar 168 closes contacts 172, thus establishing a circuit to the ratchet relay 180 and thereby shifting the contact 182 to make contact with the contact 188. This has the effect of reversing the four-way valve 114 which immediately initiates traverse of the carriage 36 in the opposite direction. Initial traverse of the carriage 36 immediately opens the previously closed one of the limit switches 96 and 98, thereby de-energizing the relay 158 and permitting the contact bar 160 to close the contacts 162 and to thereby establish a circuit to the solenoid 122. The solenoid 122 when energized, moves the spring 126 upwardly thus biasing the platform 26 of the weighing device upwardly into contact with the under surface of the bucket or buckets being moved thereover.

This completes a cycle of the machine and it continues to operate as above described back and forth so long as material is kept supplied to the hopper or tray 16 of the feed mechanism.

While it forms no part of the present invention, it may be mentioned that an elevator may conveniently be provided for continuously discharging bulk material into the hopper 16 at a controlled rate so that in effect the weighing mechanism will operate without attention, automatically, to effect very accurate and rapid weighing of predetermined masses of bulk material and discharging them from the nozzle 130.

The drawings and the foregoing specification constitute a description of the improved automatic weighing machine in such full, clear, concise and exact terms as to enable any person skilled in the art to practice the invention, the scope of which is indicated by the appended claims.

What we claim as our invention is:

1. Weighing and discharge apparatus comprising a weighing scale having a vertically movable horizontal weighing platform, a pair of open-bottom buckets, a carriage for moving said buckets reciprocable horizontally between limiting positions in which one or the other of said buckets is located directly over said platform, releasable bucket supporting means on said carriage for each of said buckets, and means automatically operated upon movement of said carriage to one limiting position to release the releasable supporting means associated with the bucket located directly over said platform for downward movement onto said platform.

2. In apparatus of the class described, a weighing platform, an open-bottom bucket, means for moving said bucket to discharge weighed material therein, releasable suspension means for said bucket, means operable prior to initiation of a weighing cycle for actuating said suspension means to release said bucket for movement onto said platform, and means automatically operable upon completion of a weighing cycle for actuating said suspension means to pick up and suspend said bucket.

3. In apparatus of the class described, a weighing platform, an open-bottom bucket, means for moving said bucket to discharge weighed material therein, releasable suspension means for said bucket, means operable prior to initiation of a weighing cycle for actuating said suspension means to release said bucket for movement onto said platform, and means operable upon completion of a weighing cycle for actuating said suspension means to pick up and suspend said bucket, said platform having resilient means associated therewith for lifting said platform, and means operable to actuate said resilient means upon completion of a weighing cycle to lift said platform, and for rendering said resilient means ineffective prior to initiation of the following weighing cycle.

4. Weighing and discharge apparatus comprising a weighing scale having a vertically movable horizontally disposed weighing platform, a pair of open-bottom buckets, a carriage for moving said buckets reciprocable horizontally between limiting positions in which one or the other of the buckets is located directly over said platform, traverse means for said carriage, feed means for feeding bulk material into the bucket located over said platform, means responsive to attainment of a predetermined weight on said platform to discontinue feed and to traverse said carriage to the other limiting position, said carriage having independently releasable bucket supporting means thereon for each of said buckets, means automatically operable upon attainment of said predetermined weight to actuate the bucket supporting means to engage and support the bucket located directly over said platform, and means automatically operable upon completion of traverse of said carriage to its other limiting position to actuate the bucket supporting means to release the bucket over said platform for movement onto said platform.

5. Weighing and discharge apparatus comprising a weighing scale having a vertically movable horizontally disposed weighing platform, a pair of open-bottom buckets, a carriage for moving said buckets reciprocable horizontally between limiting positions in which one or the other of the buckets is located directly over said platform, traverse means for said carriage, feed means for feeding bulk material into the bucket located over said platform, means responsive to attainment of a predetermined weight on said platform to discontinue feed and to traverse said carriage to the other limiting position, said carriage having independently releasable bucket supporting means thereon for each of said buckets, means responsive to attainment of said predetermined weight to actuate the bucket supporting means to engage and support the bucket located directly over said platform, and means operable in response to completion of traverse of said carriage to its other limiting position to actuate the bucket supporting means to release the bucket over said platform for movement onto said platform, selectively operable resilient means associated with said scale effective to urge said platform upwardly and means operable to actuate said resilient means and responsive to attainment of said predetermined weight to urge said platform upwardly and to discontinue operation of said resilient means at the beginning of the next feeding operation.

6. Weighing and discharge apparatus comprising a weighing scale having a vertically movable horizontally disposed weighing platform, a pair of open-bottom buckets, a carriage for moving said buckets reciprocable horizontally between limiting positions in which one or the other of the buckets is located directly over said platform, traverse means for said carriage, feed means for feeding bulk material into the bucket located over said platform, means responsive to attainment of a predetermined weight on said platform to discontinue feed and to traverse said carriage to the other limiting position, said carriage having independently releasable bucket supporting means thereon for each of said buckets, said supporting means comprising fingers recessed at the ends at opposite sides of said buckets and pins on said carriage movable toward and away from said fingers, levers for actuating said pins, and a single solenoid mounted in fixed position on said apparatus at each side of the carriage to cooperate with the levers for actuating the pins supporting the bucket located directly over the platform.

7. Apparatus as defined in claim 6 in which the pins and fingers have cooperating camming recesses effective to raise the associated bucket when engaged.

8. Apparatus as defined in claim 7 in which a single pin is located at one side of said carriage for cooperation with each bucket, and a pair of pins are located at the other side of said carriage for cooperation with each bucket.

9. Apparatus as defined in claim 8 in which the camming recess associated with the single pin is of circular cross-section to provide point location of the finger associated therewith, and the camming recesses associated with the pair of pins are of horizontally extending V-shape.

10. Weighing and discharge apparatus comprising a weighing scale having a vertically movable horizontally disposed weighing platform, a pair of open-bottom buckets, a carriage for moving said buckets reciprocable horizontally between limiting positions in which one or the other of the buckets is located directly over said platform, traverse means for said carriage, feed means for feeding bulk material into the bucket located over said platform, means responsive to attainment of a predetermined weight on said platform to discontinue feed and to traverse said carriage to the other limiting position, independent bucket lift and support means on said carriage for each of said buckets, biasing means operable to lift said platform, means operable upon completion of a traverse stroke to initiate operation of said feed means, to actuate the bucket lift and support means of the bucket over said platform to release said bucket, and to actuate said biasing means to free said platform for a weighing operation, and means operable upon completion of a weighing cycle to terminate operation of said feed means, to actuate the bucket lift and support means of the bucket over said platform to lift and support said bucket, to actuate said biasing means to lift said platform, and to initiate traverse of said carriage.

11. Weighing and discharge apparatus comprising a weighing scale having a vertically movable horizontally disposed weighing platform, a pair of open-bottom buckets, a carriage for moving said buckets reciprocable horizontally between limiting positions in which one or the other of the buckets is located directly over said platform, traverse means for said carriage, feed means for feeding bulk material into the bucket located over said platform, means responsive to attainment of a predetermined weight on said platform to discontinue feed and to traverse said carriage to the other limiting position, independent bucket lift and support means on said carriage for each of said buckets, means operable upon completion of a traverse stroke to initiate operation of said feed means, to actuate the bucket lift and support means of the bucket over said platform to release said bucket, and means operable upon completion of a weighing cycle to terminate operation of said feed means, to actuate the bucket lift and support means of the bucket over said platform to lift and support said bucket, and to initiate traverse of said carriage.

12. In a weighing machine, a weighing scale having a platform, a carriage movable transversely over said platform, a pair of open-bottom buckets in said carriage, independent releasable bucket lifting and supporting means in said carriage for each of said buckets, and means operable to actuate said lifting and supporting means to release a bucket for movement onto said platform for a weighing operation and to lift said bucket following a weighing operation and to support said bucket for subsequent movement with said carriage.

13. In a weighing machine, a weighing scale having a platform, a carriage movable transversely over said platform, a pair of open-bottom buckets in said carriage, independent releasable bucket lifting and supporting means in said carriage for each of said buckets, and means operable to actuate said lifting and supporting means to release a bucket for movement onto said platform for a weighing operation and to lift said bucket following a weighing operation and to support said bucket for subsequent movement with said carriage, spring means associated with said platform, and means for actuating said spring means to urge said platform upwardly between successive weighing operations.

14. In automatic weighing apparatus of the type comprising a weighing scale having a platform, a plurality of open bottom buckets, and a carriage movable linearly to carry said buckets successively to a position over said platform, to release them onto said platform for simultaneous filling and weighing, and to thereafter raise said buckets and remove them from said scale: the improvement which comprises reciprocable members on said carriage at opposite sides of each of said buckets, said members being movable toward and away from the associated bucket, and camming means on said buckets and members shaped to cause inward movement of said members to raise the associated bucket.

15. Structure as defined in claim 14 in which a single one of said members is provided at one side of each bucket and a pair of said members is provided at the opposite side of each bucket to provide three-point suspension for said buckets.

16. Structure as defined in claim 15 in which the camming means at the side of each bucket having a single member associated therewith is provided with a camming recess of circular cross-section and an element shaped to enter said recess to provide accurate point location, the camming means at the opposite side of each bucket comprising means forming a pair of horizontally elongated camming recesses and elements shaped to enter therein with provision for horizontal movement to provide for all elements to seat firmly in their associated camming recesses.

17. In automatic weighing apparatus of the type comprising a weighing scale having a platform, a plurality of open bottom buckets, and a carriage movable linearly to carry said buckets successively to a position over said platform, to release them onto said platform for simultaneous filling and weighing, and to thereafter raise said buckets and remove them from said scale: the improvement which comprises selectively operable resilient means operatively connected to said scale platform to urge said platform upwardly into contact with the bottoms of said buckets as they are moved off of said platform, and means for rendering said resilient means inoperative during weighing of each bucket and its contents.

References Cited in the file of this patent

UNITED STATES PATENTS

| Number | Name | Date |
| --- | --- | --- |
| 441,302 | Harmless | Nov. 25, 1890 |
| 683,304 | Lemon | Sept. 24, 1901 |
| 706,442 | McLeod | Aug. 5, 1902 |
| 720,008 | Doble | Feb. 10, 1903 |
| 1,149,079 | Popow | Aug. 3, 1915 |
| 1,203,285 | Webber | Oct. 31, 1916 |
| 1,304,490 | Knecht | May 20, 1919 |
| 1,364,003 | Smith | Dec. 28, 1920 |
| 1,408,219 | Matthews | Feb. 28, 1922 |
| 1,628,909 | Preble | May 17, 1927 |
| 1,980,057 | Horkavi | Nov. 6, 1934 |
| 2,033,586 | Noble | Mar. 10, 1936 |
| 2,242,576 | Feilders | May 20, 1941 |

FOREIGN PATENTS

| Number | Country | Date |
| --- | --- | --- |
| 364,942 | Germany | Dec. 5, 1922 |
| 58,493 | Holland | Nov. 15, 1946 |